3,093,439
PROCESS FOR PREPARING TANNED COLLAGE-
NOUS MATERIAL WITH DIALDEHYDE STARCH
James W. Bothwell, New Brunswick, N.J., assignor to
Johnson & Johnson, a corporation of New Jersey
No Drawing. Filed July 5, 1961, Ser. No. 121,822
5 Claims. (Cl. 8—94.11)

This invention relates to the tanning of collagenous material of mammalian origin in sheet or tubular form suitable for implanting permanently or temporarily in a mammal, and more particularly relates to the tanning of collagenous material by the use of a poly-functional aldehyde derived from starch by periodate oxidation. A particularly suitable collagenous material for use in the practice of this invention is described in U.S. Patent No. 2,900,644, August 25, 1959, wherein it is disclosed that such material may be obtained from mammalian tubular blood vessels and especially from a bovine tubular blood vessel from which the objectionable parenchymatous protein is removed by digestion with a proteolytic enzyme such as ficin.

In order for collagenous material and particularly tubular collageonous material of mammalian origin to be suitable for implanting permanently or temporarily in a mammal, it must be tanned so that it has increased resistance to breakdown by normal body processes and have a high resistance to rupture because of the normal flexes and strains to which it is subjected during the time of its implantation. Short abdominal grafts of tubular collagenous material prepared from bovine tubular blood vessels which have been tanned with tanning agents such as aqueous formaldehyde, glyoxal, and chromic oxide have been shown to have a high order of success and resistance to rupture when implanted in dogs. However, when short segments of such tanned tubular collagenous material of bovine arterial origin are used as thoracic and long segments are used as thoraco abdominal grafts in dogs, the incidence of rupture within one or two weeks following implantation has been found to be increased significantly. This demonstrates that tanning of grafts with formaldehyde does not produce a bonding with sufficient durability to resist the natural breakdown processes of the body so that it is considered necessary to develop a tanning agent and tanning procedure for tubular collagenous material of bovine arterial origin able to insure a high degree of resistance to rupture when used as thoracic and thoraco abdominal grafts in dogs and particularly when used as long grafts.

The discoveries associated with the invention and relating to the solution of the above problems and the objectives achieved in accordance with the invention as set forth herein include: The provision of collagenous material of mammalian origin in sheet form or tube form tanned with a poly-functional aldehyde derived from starch by periodate oxidation so that it has increased resistance to breakdown by normal body processes; the provision of tubular collagenous material of mammalian origin in Y or T form tanned by treatment with a poly-functional aldehyde derived from starch by periodate oxidation so that it has increased resistance to breakdown by normal body processes; the provision of a process for preparing tubular collagenous material of mammalian origin from which the objectionable parenchymatous protein is substantially removed by digestion with a proteolytic enzyme to increase the collagenous solid content to at least 80% and tanning to increase resistance to rupture when used as an abdominal, thoracic or thoraco abdominal graft in dogs by treatment with a poly-functional aldehyde derived from starch by periodate oxidation; the provision of a tubular collagenous material of mammalian origin substantially in its naturally-produced form containing at least 80% collagenous solids and not over 20% objectionable protein and tanned to provide increased resistance to rupture when used as an abdominal, thoracic, or thoraco abdominal graft in dogs by treatment with a poly-functional aldehyde derived from starch by periodate oxidation; the provision of such a process and followed by storing the washed product in a storage fluid such as 50% aqueous U.S.P. alcohol or isopropyl alcohol which may contain a sterilizing agent such as 1% propylene oxide; and other objectives which will be apparent as details or embodiments of the invention are set forth hereinafter.

In order to facilitate a clear understanding of the invention the following specific embodiments are detailed.

*Example 1*

Twenty inch long sections of fresh beef carotid artery were removed between the origin at the innominate and the cephalic bifurcation in the head immediately following carcass splitting operation, washed in cold water, freed of adherent connective tissue, digested for two hours and fifteen minutes at 37° C. in a solution of one percent (weight/volume) commercial ficin buffered at pH 5.1 with an 0.1 M citric acid-sodium citrate buffer, washed for two hours in five changes of distilled water, treated for 24 hours with 0.1% aqueous sodium chlorite solution to inactivate any ficin which may have been adsorbed to the collagen fibers of the digested artery, and immersed for eighteen hours at room temperature in a tanning solution prepared by adding 1.3 grams of periodate oxidized corn starch containing 80% dialdehyde starch calculated on an anhydrous basis to a solution of ten grams of sodium bicarbonate in 100 milliliters of water and stirred until solution is complete. The pH of the tanning solution was 8.8. The artery was removed from the tanning solution and washed with distilled water for two hours to remove excess tanning agent.

The shrinkage temperature of tanned bovine artery segments prepared as above came within the range of 84–90° C. The shrinkage temperature of bovine artery segments prepared and tanned according to the above procedure is used as a measure of the degree of tanning obtained and also to determine the stability against reversal of tanning by sterilization procedures. Shrinkage temperature ($T_s$), the temperature at which twenty percent of the potential shrinkage has occurred, is recommended in the tanning industry to indicate the degree of tanning (Gustavson, K. H., The Chemistry and Reactivity of Collagen, Academic Press, N.Y., 1956, p. 227) wherein it is stated that tanning of collagen increases its shrinkage temperature and the shrinkage temperature is therefore important in controlling tanning processes. The shrinkage temperature of tanned bovine artery segments was determined by the method and device described by McLaughlin and Theis (McLaughlin, G. D., and Theis, E. R., "Chemistry and Leather Manufacture," Am. Chem. Soc. Monograph No. 101, New York, Reinhold Publishing Co., 1945, p. 135).

Bovine artery segments prepared and tanned according to the above method were sterilized by immersion for 14 days at 100° F. in 50% aqueous ethanol containing 1% propylene oxide and then had a shrinkage temperature within the range of 84–90° C. which corresponds to the shrinkage temperature range before immersion in the sterilizing solution. The absence of change in shrinkage temperature range established that tanning with dialdehyde starch results in the production of a tanned bovine artery segment which is stable in the sterilizing solution.

A thirty pound mongrel dog was anesthetized with pentobarbital sodium to achieve general anesthesia. Maintenance of respiration was achieved by means of a Burns type valve. Two incisions were made to permit insertion of a thoraco abdominal implantation graft. One was prepared in the left lateral aspect of the abdomen and the other was a left thoracotomy at the level of the seventh intercostal space. The left lung was collapsed and respiration was maintained in the right lung by intermittent positive pressure.

A graft prepared as described above and tanned for eighteen hours at room temperature at pH 8.8 in aqueous 1.3% (weight/volume) dialdehyde starch (80% conversion) in saturated sodium bicarbonate and sterilized as described had a shrinkage temperature of 88° C. before sterilization and a shrinkage temperature of 86° C. after sterilization. The sterile graft which had a length of 23.4 centimeters and a diameter of 12.0 millimeters at the proximal end and 11.0 millimeters at the distal end, was implanted in the anesthetized dog according to the following procedure: An end to side anastomosis was first completed with the graft and abdominal aorta at a point just above the inferior mesenteric artery. On completion of the anastomosis the graft was threaded through an artificial hiatus produced in the diaphragm. The thoracic arota was transected and the graft was anastomosed with the proximal cut end of the aorta. The distal end was closed with a double layer and remained as a blind pouch. The incisions were closed and the dog allowed to recover. An aortogram was taken after three weeks, the dog was sacrificed and the graft removed for gross and microscopic findings. The aortogram showed no change in diameter or shape of the graft. On gross inspection the adventitial coat still retained its woven appearance in the thoracic region, but was invaded in the abdominal zone. There was some mural thrombus but this was minimal.

On microscopic inspection a moderate invasion of the adventitia only, with marked round cell invasion of the peripheral zone, was observed. There was also quite a few plasma cells. The media had not been invaded. There were quite a few giant cells present. The reaction at the suture line was most prominent and included a moderate number of eosinophils.

*Example 2*

A twenty-eight pound mongrel dog was grafted with a thoraco abdominal graft as in Example 1. The graft used was 22.5 centimeters long and had a diameter of 13.0 millimeters at the proximal end and 11.5 millimeters at the distal end. The graft had been prepared, tanned and sterilized in the same manner as the graft used in Example 1 and had a shrinkage temperature before sterilization of 87° C. and a shrinkage temperature after sterilization of 86° C.

An aortogram was taken at five weeks, the dog sacrificed, and the graft removed for gross and microscopic findings. The aortogram showed no dilatation. On gross inspection the graft did not collapse in the absence of internal pressure. The adventitia was invaded. Internally, there was mural thrombus. There were two small (2 millimeters) plaques on the intima in the thoracic zone. Microscopic observations indicated minimal tissue reaction in all sections with good invasion up to the media. The invading tissue was mainly fibroblastic with relatively little collagen.

*Example 3*

A thirty-two pound mongrel dog was grafted with a thoraco abdominal graft as in Example 1. The graft used was 22.0 centimeters long and had a diameter of 13.0 millimeters at the proximal end and 11.5 millimeters at the distal end. The graft had been prepared, tanned and sterilized in the same manner as the graft used in Example 1 and had a shrinkage temperature before sterilization of 86° C. and a shrinkage temperature after sterilization of 88° C.

An aortogram was taken at nine weeks, the dog sacrificed, and the graft removed for gross and microscopic findings. The aortogram revealed no evidence of dilatation or irregularity. On gross observations there were beginnings of pseudo intima at both ends without much mural thrombus. Microscopic observations indicated good invasion of the adventitia with a loose layer supporting the graft. On the exterior there was a loose form of connective tissue supporting an acute inflammatory reaction characterized by polymorphonuclear leukocytes and lymphocytes with marked capillary proliferation. There were occasional lymphocytic foci.

*Example 4*

An eighteen pound mongrel dog was subject to hypothermia to reduce the body temperature to 31° C. The animal was anesthetized with pentobarbital sodium to achieve general anesthesia and maintenance of respiration was acheved by means of a Burns type valve. The thoracic aorta was approached by a left thoracotomy at the level of the seventh intercostal space. The left lung was collapsed and respiration maintained in the right lung only by intermittent positive pressure. The intercostal arteries likely to interfere with the procedure were tied and transected. A piece of umbilical tape passed under the aorta and used as traction greatly facilitated identification and tying of the tributaries. Having mobilized a desired length of aorta, non-crushing vascular clamps (Potts coarction forceps) were placed at the most proximal and distal free points and the section of artery between the clamps was resected. Care was taken to leave sufficient cuff to permit suturing.

The proper length of graft (5.6 centimeters) required to fill the defect was determined by accurate measurement and the prosthesis was cut accordingly. The graft used was 5.6 centimeters long and had a diameter of 8.7 millimeters. The graft had been prepared, tanned and sterilized in the same manner as the graft used in Example 1, and had a shrinkage temperature before sterilization of 86° C. and a shrinkage temperature after sterilization of 87° C. Using 5–0 arterial silk swedged to a half circle needle, two guy sutures were placed through the lateral edges of the proximal cut end of the aorta and the graft. Mosquito forceps attached to one end were allowed to hang outside the incision thereby creating traction. This helped to bring the line of anastomosis into view and simplified the suturing procedure. The distal free end of the graft was flipped dorsad to expose the underside of the anastomatic line. The lower half was closed with a continuous over and over stitch using one of the long needle ends of a previously placed guy suture. The graft was returned to the horizontal position and the upper half of the proximal anastomatic line was closed in a similar fashion. The distal anastomosis was started by placing two guy sutures in such a manner as to bisect the lumen laterally. Sutures so placed permitted the rotation of the graft in a horizontal plane and allowed easy placement of sutures throughout the entire circumference. The anastomosis was accomplished in the same manner as the proximal end using a continuous over and over suture. On completion of the anastomosis, the distal clamp was released and the graft permitted to fill by retrograde flow. The proximal clamp was then released to re-establish circulation. Hermorrhage occured at both suture lines but was arrested by wrapping the suture line with a gauze sponge and gently applying pressure. The incision was closed and the dog allowed to recover.

After three weeks the dog was subjected to aortography to evaluate in situ appearance of the graft and then sacrificed for closer evaluation of graft appearance. The aortogram showed no dilatation. Gross inspection indicated that its general appearance had not changed although some invasion of the adventitia had occurred. Microscopic examination showed some degree of infiltration but only within the adventitial layer. There was a moderate mononuclear response.

Example 5

A fifteen pound mongrel dog was subjected to hypothermia to reduce body temperature to 31° C. The animal was anesthetized with pentobarbital sodium to achieve general anesthesia and maintenance of respiration was achieved by means of a Burns type valve. A thoracic implant operation was performed as described in Example 4. The graft inserted was 5.3 centimeters long and had a diameter of 9.5 millimeters and had a shrinkage temperature before sterilization of 87° C. and a shrinkage temperature after sterilization of 86° C. The graft had been prepared, tanned and sterilized in the same manner as the graft used in Example 1.

After five weeks the dog was subjected to aortography to evaluate in situ appearance, the dog was sacrificed and the graft was removed for gross and microscopic findings. The aortogram showed no dilatation. On gross inspection there was no thrombus. The graft appearance had not significantly changed. On microscopic inspection the adventitial collagen was fairly well infiltrated but the media remained intact. There was an acute inflammatory reaction in this zone. The inflammatory cells were dispersed between the bundles. That reaction varied in intensity in different areas.

Example 6

A twenty pound mongrel dog was subjected to hypothermia to reduce the body temperature to 31° C. The dog was anesthetized with pentobarbital sodium to achieve general anesthesia and maintenance of respiration was achieved by means of a Burns type valve. A thoracic implant operation was performed as in Example 4. The graft inserted was 4.5 centimeters long and had a diameter of 9.8 millimeters. The graft had been prepared, tanned and sterilized in the same manner as the graft used in Example 1 and had a shrinkage temperature before sterilization of 86° C. and a shrinkage temperature after sterilization of 86° C.

After nine weeks the dog was subjected to aortography to evaluate in situ appearance of the graft; the dog was sacrificed and the graft removed for gross and microscopic findings. The aortogram showed no dilatation. On gross inspection the graft did not appear to have been significantly changed. Microscopic inspection showed cellular invasion along the interface but most pronounced at the suture lines. The cell types consisted of lymphocytes and plasma cells. There was little adventitial invasion and what there was was of the inflammatory type. Fibroblast proliferation was noticeable.

Example 7

Bovine arteries were prepared in the same manner as in Example 1 except they were tanned by immersion for eighteen hours in an aqueous 1.0% formalin solution buffered with 0.1 Molar sodium-potassium phosphate at pH 7.2. The tanned grafts had shrinkage temperatures within the range of 86° C. to 91° C. before immersion in the sterilizing solution and shrinkage temperatures within the range of 70° C. to 76° C. after immersion in the sterilizing solution. The substantial lowering of the shrinkage temperature following tanning by formalin showed that the tanned product was substantially less stable than the product tanned by dialdehyde starch. The tanned grafts were sterilized in the same manner as in Example 1.

A twenty-eight pound mongrel dog was anesthetized with pentobarbital sodium to achieve general anesthesia and maintenance of respiration was achieved by means of a Burns type valve. The dog was grafted with a thoraco abdominal graft prepared as above using the implantation technique described in Example 1. The graft used was 24.5 centimeters long and had a proximal diameter of 11.0 millimeters and a distal diameter of 10.0 millimeters and had a shrinkage temperature before sterilization of 87° C. and a shrinkage temperature after sterilization of 73° C.

The dog died eleven days postoperatively due to an ill-defined rupture in the thoracic cavity.

Example 8

A thirty-one pound mongrel dog was grafted with a thoraco abdominal graft using the implantation technique described in Example 1. The graft had been prepared, tanned and sterilized in the same manner as the graft used in Example 7. The graft was 22.0 centimeters long and had a diameter of 11.0 millimeters at the proximal end and 10.0 millimeters at the distal end and had a shrinkage temperature before sterilization of 86° C. and a shrinkage temperature after sterilization of 73° C.

The dog died seventeen days postoperatively due to a rupture in the abdominal cavity.

Example 9

A thirty pound mongrel dog was grafted with a thoraco abdominal graft using the implantation technique described in Example 1. The graft had been prepared, tanned and sterilized in the same manner as the graft used in Example 7. The graft was 23.0 centimeters long and had a proximal diameter of 10.5 millimeters and a distal diameter of 10.5 millimeters and had a shrinkage temperature before sterilization of 91° C. and a shrinkage temperature after sterilization of 75° C.

After nine weeks the dog was subjected to aortography to evaluate in situ appearance of the graft, and then sacrificed for closer evaluation of its gross and microscopic appearance. The aortogram indicated no dilatation. Gross appearance indicated that the artery was in good condition and would be considered satisfactory at this stage. There was some thinning at the proximal end possibly due to too severe dissection at the time of autopsy. Pseudo intima extended from both suture lines for 2 to 2.5 centimeters. There was one focal zone in the proximal end with relatively thick thrombus associated with inflammation. Microscopic examination indicated good invasion of the graft. Close to the suture line the fibroblasts were oriented in a longitudinal manner but they were randomly oriented elsewhere. There was lymphocytic, plasmacytic and fibroblastic response in the region of the suture. In other areas there was a modest polymorphonuclear reaction within the pre-existing adventitial layer with somewhat less invasion of the graft. There was moderate mural thrombus in other areas. There was extensive capillary proliferation on the periphery. In general, the overall reaction to the graft was good.

Comparable or analogous results to the foregoing may be accomplished with various modifications thereof including the following.

A tubular mammalian vessel is used as the starting material, and particularly preferred is a bovine tubular vessel, including those having a Y or T branch form.

Tubular mammalian vessels prepared and tanned according to the method of this invention are particularly suitable for implantation as replacements for defective vascular, esophagus and ureter segments but may also be used in sheet form for hernia repair.

The enzyme solution may be commercial ficin material or a purified or concentrated material containing the proteolytic enzyme and may be used in a concentration in the range of about 0.25 to 5.0% of active ficin, desirably 0.5 to 2.0%, and preferably 0.5 to 1.5%, the higher concentration resulting in faster digestion. The digestion temperature may be at the range of 30 to 45° C., desirably 34 to 40° C., and preferably 36 to 38° C.; the higher temperature giving faster digestion. The parts by weight of artery (wet) relative to enzyme solution may be in the range of 1 to 3 per 10 parts of solution, desirably 1 to 2, and preferably 1.5. The treating solution should be buffered and the pH may be in the range of 4.0 to 7.0, desirably 4.5 to 6.0, and preferably 5.0 to 5.5, the latter giving the faster digestion The digestion times may be in the range of 2.0 to 8.0 hours, desirably 2.5 to 6.0, and preferably 2.5 to 3.0 hours. The concentration, amount, pH, temperature and time are selected to give the desired increase in collagenous solids content.

In collagenous material prepared by enzyme treatment of a mammalian tubular vessel in the above manner, objectionable parenchymatous protein is removed by enzyme digestion and the collagen fibrils are present substantially in their naturally produced relationship and contain at least 80% collagenous solids and not over about 20% of other or objectional protein based on the weight of solids therein.

The periodate oxidized starch and preferably corn starch used in the tanning process of this invention may contain 50 to 100 percent dialdehyde starch calculated on an anhydrous basis and preferably at least about 80%. If the starch contains less than about 50% dialdehyde starch calculated on an anhydrous basis, tanning of a tubular mammanlian vessel proceeds at an undesirably low rate. The dialdehyde starch may be solubilized in a saturated aqueous solution of sodium bicarbonate but aqueous solutions of other compounds such as calcium oxide, magnesium oxide, sodium hydroxide, and sodium sulfate may also be used. Solubilization may be accomplished at a pH within the range of about 7.5 to about 12, preferably within the range of about pH 8 to about 9. Solubilization at a pH below about 7.5, proceeds at an undesirably low rate and the use of such a solution of dialdehyde starch may result in insufficient tanning. If the solubilization is accomplished at a pH greater than about 12, there may be some breakdown of the collagen of the mammalian tubular vessel to be tanned. The dialdehyde starch may be used in a range of concentration from about 0.5 to about 10% (weight/volume) in the tanning solution. If the concentration of dialdehyde starch in the tanning solution is less than about 0.5%, tanning is undesirably slow and ineffective and if the concentration of dialdehyde starch in the tanning solution is above about 10%, no advantage is obtained with respect to degree or speed of tanning. About eighteen hours is required for satisfactory tanning of a tubular mammalian vessel by the use of a tanning solution having a concentration of about 1.3% dialdehyde starch, and this is the preferred concentration. The speed of tanning is increased with an increase in the concentration of dialdehyde starch in the tanning solution so that if the concentration is about 10%, satisfactory tanning is accomplished in about two hours. Tanning is preferably accomplished at room temperature. In order that tanning be stopped, the mammalian vessel is removed from the tanning solution and washed with distilled water until the excess tanning agent is removed. This requires about two hours.

Satisfactory tanning is considered to have been accomplished if the shrinkage temperature of the tanned tubular mammalian vessel is within the range of from about 84° C. to about 90° C., the preferred shrinkage temperature is within the range of from about 86° C. to about 88° C.; and for this purpose the shrinkage temperature is considered to be the temperature at which 20% of the potential shrinkage has occurred.

In view of the foregoing disclosures, variations or modifications thereof will be apparent, and it is intended to include within the invention all such variations and modifications except as do not come within the scope of the appended claims.

What is claimed is:

1. A process for preparing tanned collagenous material of mammalian origin useful for implanting in a mammal which comprises immersing collagenous material of mammalian origin which contains at least 80% by weight collagenous solids in an aqueous solution of periodate oxidized starch containing about 50 to about 100% dialdehyde starch calculated on an anhydrous basis having a concentration from about 0.5 to about 10% (weight/volume) and a pH within the range of about 7.5 to about 12 for sufficient time to bring the shrinkage temperature of the tanned collagen to from about 84° C. to about 90° C.; removing the tanned collagen from the tanning solution and washing the tanned collagen with distilled water until excess tanning agent is removed therefrom.

2. A process of claim 1 followed by sterilization.

3. A process for preparing tanned collagenous material of mammalian origin useful for implanting in a mammal which comprises immersing collagenous material of mammalian origin which contains at least 80% by weight collagenous solids in an aqueous solution of periodate oxidized starch containing at least about 80% dialdehyde starch calculated on an anhydrous basis having a concentration from about 0.5 to about 10% (weight/volume) and a pH within the range of about 8 to about 9 for sufficient time to bring the shrinkage temperature of the tanned collagen to from about 84° C. to about 90° C.; removing the tanned collagen from the tanning solution and washing the tanned collagen with distilled water until excess tanning agent is removed therefrom.

4. A process of claim 3 followed by sterilization.

5. A process of claim 4 wherein the sterilization is by means of propylene oxide.

References Cited in the file of this patent

UNITED STATES PATENTS

| | | |
|---|---|---|
| 2,215,453 | Buchgraber | Sept. 24, 1940 |
| 2,640,752 | Davis et al. | June 2, 1953 |
| 2,750,251 | Bloch et al. | June 12, 1956 |
| 2,886,401 | Wells et al. | May 12, 1959 |
| 2,977,182 | Adams et al. | Mar. 28, 1961 |